(12) United States Patent
Nguyen et al.

(10) Patent No.: US 10,797,361 B2
(45) Date of Patent: Oct. 6, 2020

(54) BATTERY CHARGE VOLTAGE BASED ON AMBIENT TEMPERATURE

(71) Applicant: Hewlett Packard Enterprise Development LP, Houston, TX (US)

(72) Inventors: Hai Ngoc Nguyen, Spring, TX (US); Chiung-Chao Hsieh, Taipei (TW); Abhishek Banerjee, Houston, TX (US)

(73) Assignee: Hewlett Packard Enterprise Development LP, Houston, TX (US)

( * ) Notice: Subject to any disclaimer, the term of this patent is extended or adjusted under 35 U.S.C. 154(b) by 0 days.

(21) Appl. No.: 15/737,092

(22) PCT Filed: Jun. 16, 2015

(86) PCT No.: PCT/US2015/036061
§ 371 (c)(1),
(2) Date: Dec. 15, 2017

(87) PCT Pub. No.: WO2016/204734
PCT Pub. Date: Dec. 22, 2016

(65) Prior Publication Data
US 2018/0175460 A1    Jun. 21, 2018

(51) Int. Cl.
*H02J 7/04* (2006.01)
*H01M 10/44* (2006.01)
(Continued)

(52) U.S. Cl.
CPC ......... *H01M 10/443* (2013.01); *H01M 10/48* (2013.01); *H01M 10/486* (2013.01); *H02J 7/0029* (2013.01); *H02J 7/0091* (2013.01)

(58) Field of Classification Search
CPC ....... Y02E 60/12; H02J 7/0004; H02J 7/0006; H01M 10/48; H01M 10/4257
(Continued)

(56) References Cited

U.S. PATENT DOCUMENTS 8,624,560 B2   1/2014   Ungar et al.
8,970,182 B2   3/2015   Paryani
(Continued)

FOREIGN PATENT DOCUMENTS

JP    2012-085443    4/2012

OTHER PUBLICATIONS

Richard Perez, "Lead-Add Battery State of Charge vs. Voltage" Sep. 1993, 5 pps, <http://www.arttec.net/Solar_Mower/4_Electrical/Battery%20Charging.pdf >.
(Continued)

*Primary Examiner* — Arun C Williams
(74) *Attorney, Agent, or Firm* — Hewlett Packard Enterprise Patent Department

(57) ABSTRACT

According to an example, a battery is charged using a charge voltage based on a present state of charge of the battery and a present ambient temperature of the battery. Additionally, the charge voltage may be based on the present state of charge of the battery, the present ambient temperature of the battery, and an age of the battery. The charge voltage may be retrieved from a lookup table that includes a plurality of reference charge voltage values at which to charge the battery for different ambient temperatures, different states of charge, or different ages of the battery.

20 Claims, 8 Drawing Sheets

(51) Int. Cl.
  *H01M 10/48* (2006.01)
  *H02J 7/00* (2006.01)
(58) Field of Classification Search
  USPC .......................................................... 320/106
  See application file for complete search history.

(56) References Cited

U.S. PATENT DOCUMENTS

| | | |
|---|---|---|
| 2005/0017685 A1 | 1/2005 | Rees et al. |
| 2007/0075678 A1* | 4/2007 | Ng .................... H02J 7/047 |
| | | 320/106 |
| 2009/0295335 A1* | 12/2009 | Yang .................. H01M 10/441 |
| | | 320/134 |
| 2012/0249053 A1 | 10/2012 | Seethaler et al. |
| 2013/0138369 A1 | 5/2013 | Papana |
| 2013/0257382 A1 | 10/2013 | Field et al. |
| 2013/0314054 A1 | 11/2013 | Bergqvist |
| 2014/0214346 A1 | 7/2014 | Zhou |
| 2014/0375279 A1 | 12/2014 | Nishino |
| 2016/0144730 A1* | 5/2016 | Liu .................... B60L 11/1809 |
| | | 320/137 |

OTHER PUBLICATIONS

Search Report and Written Opinion received for PCT Application No. PCT/US2015/036061, dated Feb. 29, 2016, 11 pages.

* cited by examiner

BATTERY CHARGE VOLTAGE BASED ON AMBIENT TEMPERATURE

BACKGROUND

Rechargeable batteries have wide-spread uses in mobile electronic devices, such as laptops, smart phones, and tablets, and infrastructure support, often in form of an uninterruptible power supply (UPS). Batteries can permit mobile electronic devices to operate on batteries and eliminate the need to be constantly connected to an external power supply (e.g., AC outlet). With respect to infrastructure support, UPSs are used in a variety of applications to provide power from batteries to electrical loads when, for instance, such electrical loads are intended to operate during interruptions in a primary source of electrical power (e.g., server back-up power applications). In the context of both mobile electronic devices and infrastructure support, battery usage usually involves a number of charge and discharge cycles over the life of the batteries utilized.

BRIEF DESCRIPTION OF THE DRAWINGS

Certain examples are described in the following detailed description in reference to the following drawings.

DETAILED DESCRIPTION

Figure 1:
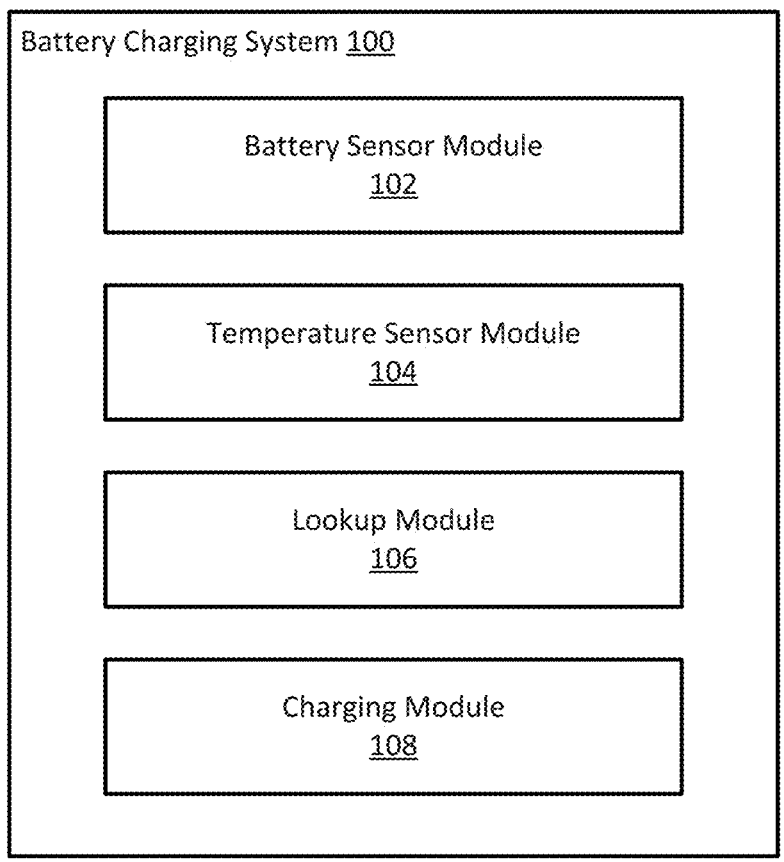
FIGS. 1 and 2 are block diagrams illustrating example battery charging systems according to the present disclosure.

Conventional battery charging techniques usually utilize a constant charge voltage based on the current state of charge and the current voltage of the battery cell. Unfortunately, charging batteries in this manner can lead to overcharging and lead to a reduction of battery life, particularly with respect to Lithium Ion batteries.

Generally, during the discharge process of a battery at a constant power output, the discharge current increases with time and causes the battery temperature to rise, and the battery voltage and state of charge are reduced as power flows from the battery to an electrical load. During the charging process of the battery under a constant charge voltage, the charging current causes battery temperature to fluctuate and this in turn causes fluctuation in the battery voltage. A constant charge voltage does not account for this fluctuation in the battery voltage and, as a consequence, the resulting charge of the battery can result in overcharging. Additionally, ageing of a battery can directly degrade the battery's capacity, internal resistance, and power handling capability. As a battery ages, if charge voltage is kept constant, the capacity of the battery decreases.

Various examples described herein provide systems and methods that relate to charging a battery based on ambient temperature of the battery and state of charge of the battery and, further, may be based on age of the battery. In this way, some examples facilitate charging a battery using a dynamically determined charge voltage that compensates for the present ambient temperature of the battery. Such compensation can prevent the battery from being overcharged. Further, certain examples facilitate charging a battery using a charge voltage that compensates for the present ambient temperature of the battery and the age of the battery, which as noted herein can decrease the battery's capacity and increase the battery's internal resistance. For some examples, as the battery ages (i.e., gets older), the charge voltage applied to the battery to attain a full charge also goes higher.

As used herein, a battery can refer to a set of battery cells or an array of batteries capable of being recharged. Use of some examples may include charging batteries in uninterruptable power supplies (UPSs) and mobile electronic devices, such as laptops, smartphones, and tablets.

Various examples described herein can improve life and reliability of a battery by using a charging voltage for the battery that is determined based on (e.g., at least accounts for) state of charge of the battery and ambient temperature of the battery. For certain examples, the life and reliability of a battery can be improved by using a charging voltage for the battery that determined based on (e.g., at least accounts for) state of charge of the battery, ambient temperature of the battery, and age of the battery. Additionally, some examples described herein can reduce frequency of service calls for battery-related issues, frequency of battery replacements, environmental waste, or reduce the number of battery cells needed per an application. One or more these improvements can result in cost reduction in battery usage.

The following provides a detailed description of examples illustrated by FIGS. 1-8.

FIG. 1 is a block diagram illustrating an example battery charging system 100 according to the present disclosure. As shown, the battery charging system 100 includes a battery sensor module 102, a temperature sensor module 104, a lookup module 106, and a charging module 108. For some examples, the battery charging system 100 is included as part of an electronic device that utilizes and may physically incorporate a battery, such as a mobile electronic device (e.g., laptop, smartphones, and tablets) or an uninterruptable power source (UPS). Additionally, the battery charging system 100 may be part of an electronic device that includes a processor that facilitates functionality of the battery charging system 100. In various examples, the components or the arrangement of components in the battery charging system 100 may differ from what is depicted in FIG. 1.

As used herein, modules and other components of various examples may comprise, in whole or in part, machine-readable instructions or electronic circuitry. For instance, a module may comprise machine-readable instructions executable by a processor to perform one or more functions in accordance with various examples described herein. Likewise, in another instance, a module may comprise electronic circuitry to perform one or more functions in accordance with various examples described herein. The elements of a module may be combined in a single package, maintained in several packages, or maintained separately.

The battery sensor module 102 may facilitate determination of a present state of charge of a battery. The type of battery may include, without limitation, Lithium ion, Lithium ion polymer, lead-acid, Nickel Cadmium (NiCd), Nickel-Metal Hydride (NiMH), and the like. To determine the present state of charge of the battery, the battery sensor module 102 may include a sensor capable of measuring the state of charge from outside of the battery. Alternatively, the battery sensor module 102 may interface with a sensor embedded in the battery that provides its state of charge. The state of charge of the battery may be represented as a percentage of the battery's capacity that is currently charged.

The temperature sensor module 104 may facilitate determination of a present ambient temperature of the battery. To determine the present ambient temperature of the battery, the battery sensor module 102 may include a temperature sensor capable of measuring the current temperature of the environment surrounding the battery. Alternatively, the temperature sensor module 104 may interface with a temperature included by the battery (e.g., disposed on the surface of the battery).

The lookup module 106 may facilitate retrieval of a certain charge voltage value, from a lookup table, based on the present ambient temperature provided by battery sensor module 102 and the present state of charge provided by the temperature sensor module 104. For example, the present ambient temperature and the present state of charge may be used as inputs to the lookup table, and the lookup table may provide the certain charge voltage value as output. According to various examples, the lookup table includes a plurality of reference charge voltage values at which to charge the battery for different ambient temperatures and different states of charge of the battery. For some examples, the certain charge voltage value retrieved from the lookup table is one that permits the battery to reach its full charge given the present ambient temperature of the battery and the present state of charge of the battery. Depending on the example, the lookup table may be in the form of a data file or a database, which once generated may be included by the battery charging system 100.

The charging module 108 may facilitate charging the battery based on the certain charge voltage value (e.g., at a charge voltage equal to the certain charge voltage value) retrieved by the lookup module 106. In particular, the charging module 108 may charge the battery at a voltage at, or approximately at, the certain charge voltage value.

Figure 2:
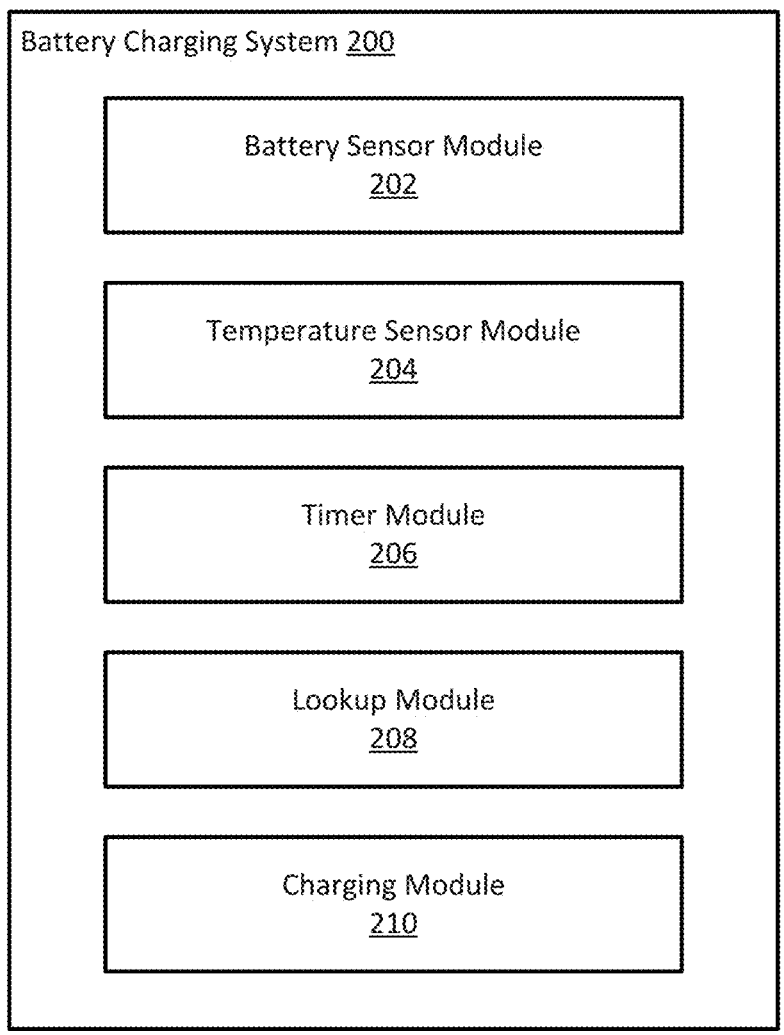

FIG. 2 is a block diagram illustrating an example battery charging system 200 according to the present disclosure. As shown, the battery charging system 200 includes a battery sensor module 202, a temperature sensor module 204, a timer module 206, a lookup module 208, and a charging module 210. As described herein, the battery charging system 200 may be included as part of an electronic device that utilizes and may physically incorporate a battery. Further, the battery charging system 200 may be part of an electronic device that includes a processor that facilitates functionality of the battery charging system 200. In various examples, the components or the arrangement of components in the battery charging system 200 may differ from what is depicted in FIG. 2.

According to some examples, the battery sensor module 202 and the temperature sensor module 204 may be similar to the battery sensor module 102 and the temperature sensor module 104 of the battery charging system 100 described above with respect to FIG. 1.

The timer module 206 may facilitate determination of a present age of the battery. For some examples, the timer module 206 includes a real-time time counter (RTC) to maintain the age of the battery. As noted herein, the charge voltage may change as the age of a battery increases and, in doing so, the charge voltage can ensure to prevent decay in capacity of the battery.

The lookup module 208 may facilitate retrieval of a certain charge voltage value, from a lookup table, based on the present ambient temperature provided by battery sensor module 202, the present state of charge provided by the temperature sensor module 204, and the present age provided by the timer module 206. For example, the present ambient temperature, the present state of charge, and the present age may be used as inputs to the lookup table, and the lookup table may provide the certain charge voltage value as output. According to some examples, the lookup table includes a plurality of reference charge voltage values at which to charge the battery or different ambient temperatures, different states of charge, and different ages of the battery. For various examples, the certain charge voltage value retrieved from the lookup table is one that permits the battery to reach its full charge given the present ambient temperature of the battery and the present state of charge of the battery. Depending on the example, the lookup table may be in the form of a data file or a database, which once generated may be included by the battery charging system 200. The following table (Table 1) presents charge voltage values for an example battery for different ambient temperatures and different ages of the battery.

TABLE 1

| Ambient | Charge Voltage | | |
|---|---|---|---|
| Temperatures | Year 1 | Year 2 | Year 3 |
| 50° C. | 15.6 V | 15.8 V | 16.0 V |
| 25° C. | 16.0 V | 16.2 V | 16.4 V |
| 10° C. | 16.4 V | 16.6 V | 16.8 V |

According to some examples, the charging module 210 may be similar to the charging module 108 of the battery charging system 100 described above with respect to FIG. 1.

Figure 3:
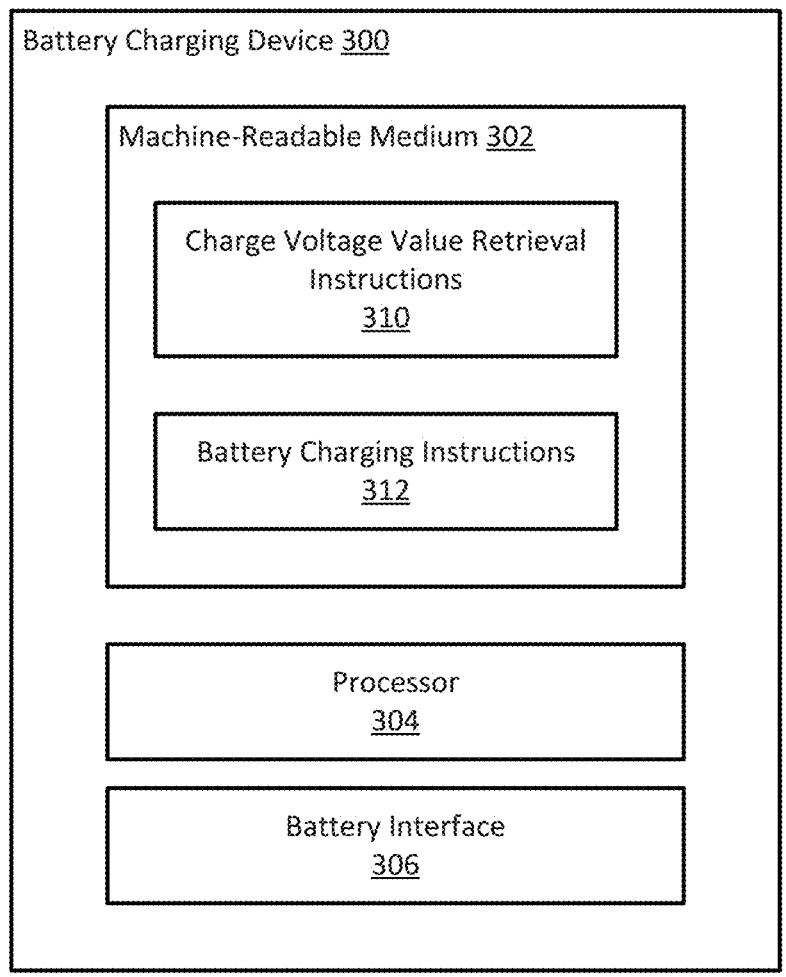
FIGS. 3, 4, and 5 are block diagrams illustrating example battery charging devices according to the present disclosure.

FIG. 3 is block diagram illustrating an example battery charging device 300 according to the present disclosure. As described herein, the battery charging device 300 may be any electronic device that interfaces with a battery and includes a processor, such as a mobile electronic device (e.g., laptop, smartphone, etc.) or an uninterruptible power supply (UPS). As shown, the battery charging device 300 includes a machine-readable medium 302, a processor 304, and a battery interface 306. In various examples, the components or the arrangement of components of the battery charging device 300 may differ from what is depicted in FIG. 3. For instance, the battery charging device 300 can include more or less components than those depicted in FIG. 3.

The machine-readable medium 302 may be any electronic, magnetic, optical, or other physical storage device that stores executable instructions. For example, the machine-readable medium 302 may be a Random Access Memory (RAM), an Electrically-Erasable Programmable Read-Only Memory (EEPROM), a storage drive, an optical disc, or the like. The machine-readable medium 302 can be encoded to store executable instructions that cause the processor 304 to perform operations in accordance with various examples described herein. In various examples, the machine-readable medium 302 is non-transitory. As shown in FIG. 3, the machine-readable medium 302 includes charge voltage value retrieval instructions 310 and battery charging instructions 312.

The processor 304 may be one or more central processing units (CPUs), microprocessors, or other hardware devices suitable for retrieval and execution of one or more instructions stored in the machine-readable medium 302. The processor 304 may fetch, decode, and execute the instructions 310, and 312 to enable the battery charging device 300 to perform operations in accordance with various examples described herein. For some examples, the processor 304 includes one or more electronic circuits comprising a number of electronic components for performing the functionality of one or more of the instructions 310 and 312.

The battery interface 306 may facilitate a coupling between the battery charging device 300 and a battery to be charged by the battery charging device. Through the battery interface 306, the battery charging device 300 and its various components can charge the battery and can gather information from the battery, including state of charge, voltage, or ambient temperature (e.g., where the battery provides such temperature).

The charge voltage value retrieval instructions 310 may cause the processor 304 to retrieve, from a lookup table, a certain charge voltage value based on a present ambient temperature and a present state of charge of a battery. As described herein, the lookup table may include a plurality of reference charge voltage values at which to charge the battery for different ambient temperatures and different states of charge of the battery.

The battery charging instructions 312 may cause the processor 304 to charge the battery based on the certain charge voltage value retrieved by the instructions 310. Through the battery interface 306, the processor 304 may charge the battery at the certain charge voltage value.

Figure 4:
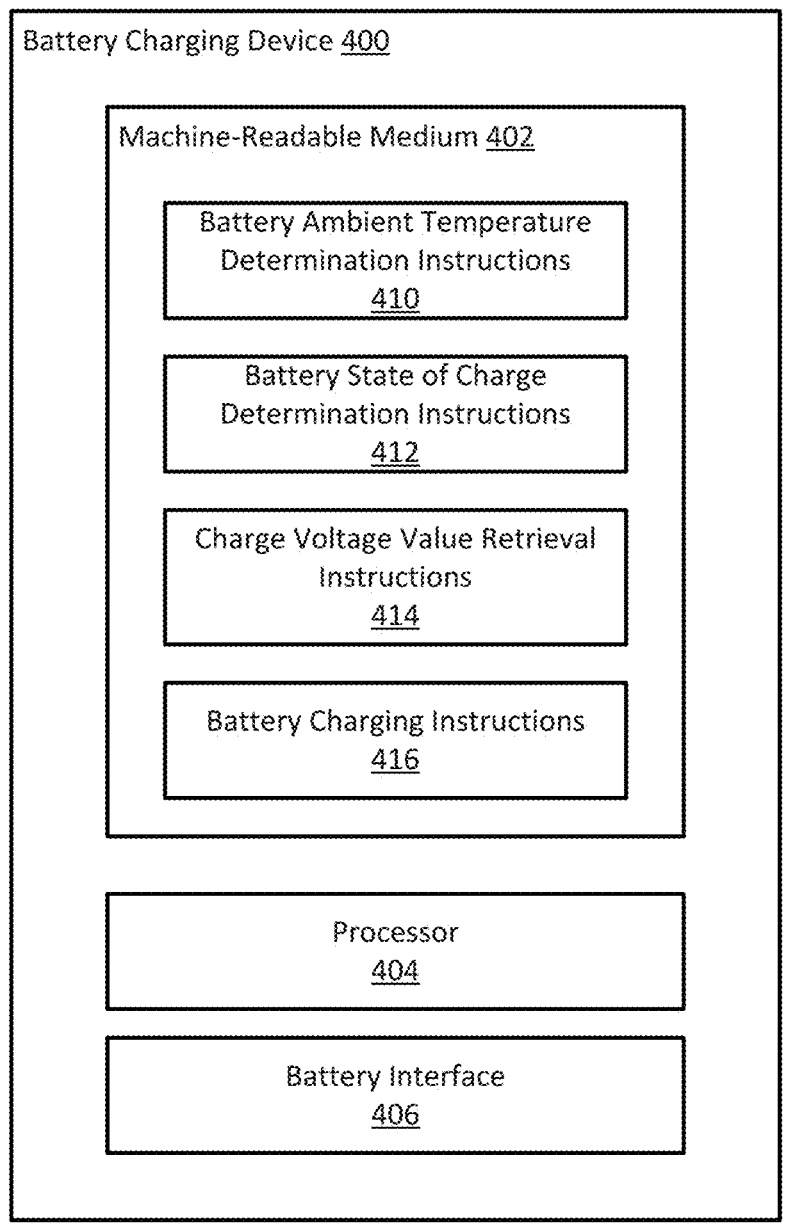

FIG. 4 is block diagram illustrating an example battery charging device 400 according to the present disclosure. As described herein, the battery charging device 400 may be any electronic device that interfaces with a battery and includes a processor, such as a mobile electronic device or an uninterruptable power supply (UPS). As shown, the battery charging device 400 includes a machine-readable medium 402, a processor 404, and a battery interface 406. In various examples, the components or the arrangement of components of the battery charging device 400 may differ from what is depicted in FIG. 4. For instance, the battery charging device 400 can include more or less components than those depicted in FIG. 4.

As described herein, the machine-readable medium 402 may be any electronic, magnetic, optical, or other physical storage device that stores executable instructions. The machine-readable medium 402 can be encoded to store executable instructions that cause the processor 404 to perform operations in accordance with various examples described herein. In various examples, the machine-readable medium 402 is non-transitory. As shown in FIG. 4, the machine-readable medium 402 includes battery ambient temperature determination instructions 410, battery state of charge determination instructions 412, charge voltage value retrieval instructions 414, and battery charging instructions 416.

As described herein, the processor 404 may be one or more central processing units (CPUs), microprocessors, or other hardware devices suitable for retrieval and execution of one or more instructions stored in the machine-readable medium 402. The processor 404 may fetch, decode, and execute the instructions 410, 412, 414, and 416 to enable the battery charging device 400 to perform operations in accordance with various examples described herein. For some examples, the processor 404 includes one or more electronic circuits comprising a number of electronic components for performing the functionality of one or more of the instructions 410, 412, 414, and 416.

As also described herein, the battery interface 406 may facilitate a coupling between the battery charging device 400 and a battery to be charged by the battery charging device. Through the battery interface 406, the battery charging device 400 and its various components can charge the battery and can gather information from the battery, including state of charge, voltage, or ambient temperature (e.g., where the battery provides such temperature).

The battery ambient temperature determination instructions 410 may cause the processor 404 to determine a present ambient temperature of a battery coupled to (and possibly included by) the battery charging device 400. The processor 404 may obtain the present ambient temperature of the battery through the battery interface 406.

The battery state of charge determination instructions 412 may cause the processor 404 to determine a present state of charge of the battery. The processor 404 may obtain the present state of charge of the battery through the battery interface 406.

The charge voltage value retrieval instructions 414 may cause the processor 404 to retrieve, from a lookup table, a certain charge voltage value based on the present ambient temperature of the battery as determined by the instructions 410, and the present state of charge of the battery as determined by the instructions 412. As described herein, the lookup table may include a plurality of reference charge voltage values at which to charge the battery for different ambient temperatures and different states of charge of the battery.

The battery charging instructions 416 may cause the processor 404 to charge the battery based on the certain charge voltage value retrieved by the instructions 414. Through the battery interface 406, the processor 404 may charge the battery at the certain charge voltage value.

Figure 5:
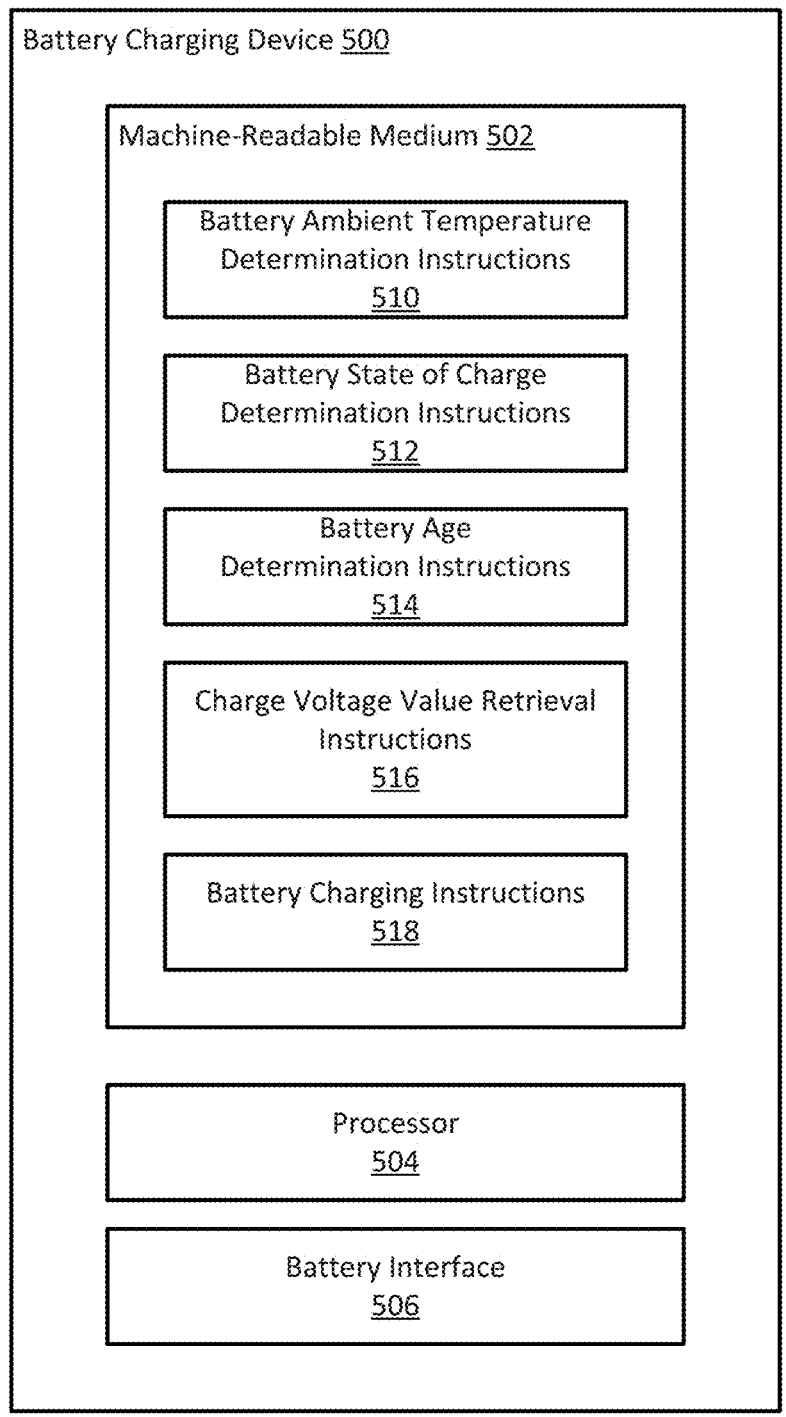

FIG. 5 is block diagram illustrating an example battery charging device 500 according to the present disclosure. As described herein, the battery charging device 500 may be any electronic device that interfaces with a battery and includes a processor, such as a mobile electronic device or an uninterruptible power supply (UPS). As shown, the battery charging device 500 includes a machine-readable medium 502, a processor 504, and a battery interface 506. In various examples, the components or the arrangement of components of the battery charging device 500 may differ from what is depicted in FIG. 5. For instance, the battery charging device 500 can include more or less components than those depicted in FIG. 5.

As described herein, the machine-readable medium 502 may be any electronic, magnetic, optical, or other physical storage device that stores executable instructions. The machine-readable medium 502 can be encoded to store executable instructions that cause the processor 504 to perform operations in accordance with various examples described herein. In various examples, the machine-readable medium 502 is non-transitory. As shown in FIG. 5, the machine-readable medium 502 includes battery ambient temperature determination instructions 510, battery state of charge determination instructions 512, battery age determination instructions 514, charge voltage value retrieval instructions 516, and battery charging instructions 518.

As described herein, the processor 504 may be one or more central processing units (CPUs), microprocessors, or other hardware devices suitable for retrieval and execution of one or more instructions stored in the machine-readable medium 502. The processor 504 may fetch, decode, and execute the instructions 510, 512, 514, 516, and 518 to enable the battery charging device 500 to perform operations in accordance with various examples described herein. For some examples, the processor 504 includes one or more electronic circuits comprising a number of electronic components for performing the functionality of one or more of the instructions 510, 512, 514, 516, and 518.

As also described herein, the battery interface 506 may facilitate a coupling between the battery charging device 500 and a battery to be charged by the battery charging device. Through the battery interface 506, the battery charging device 500 and its various components can charge the battery and can gather information from the battery, including state of charge, voltage, age (e.g., where a battery tracks such information), or ambient temperature (e.g., where the battery provides such temperature).

The battery ambient temperature determination instructions 510 may cause the processor 504 to determine a present ambient temperature of a battery coupled to (and possibly included by) the battery charging device 500. The processor 504 may obtain the present ambient temperature of the battery through the battery interface 506.

The battery state of charge determination instructions 512 may cause the processor 504 to determine a present state of charge of the battery. The processor 504 may obtain the present state of charge of the battery through the battery interface 506.

The battery age determination instructions 514 may cause the processor 504 to determine a present age of the battery. The processor 504 may maintain the age of the battery on the battery charging device 500.

The charge voltage value retrieval instructions 516 may cause the processor 504 to retrieve, from a lookup table, a certain charge voltage value based on the present ambient temperature of the battery as determined by the instructions 510, the present state of charge of the battery as determined by the instructions 512, and the present age of the battery as determined by the instructions 514. As described herein, the lookup table may include a plurality of reference charge voltage values at which to charge the battery for different ambient temperatures, different states of charge, and different ages of the battery.

The battery charging instructions 518 may cause the processor 504 to charge the battery based on the certain charge voltage value retrieved by the instructions 516. Through the battery interface 506, the processor 504 may charge the battery at the certain charge voltage value.

Figure 6:
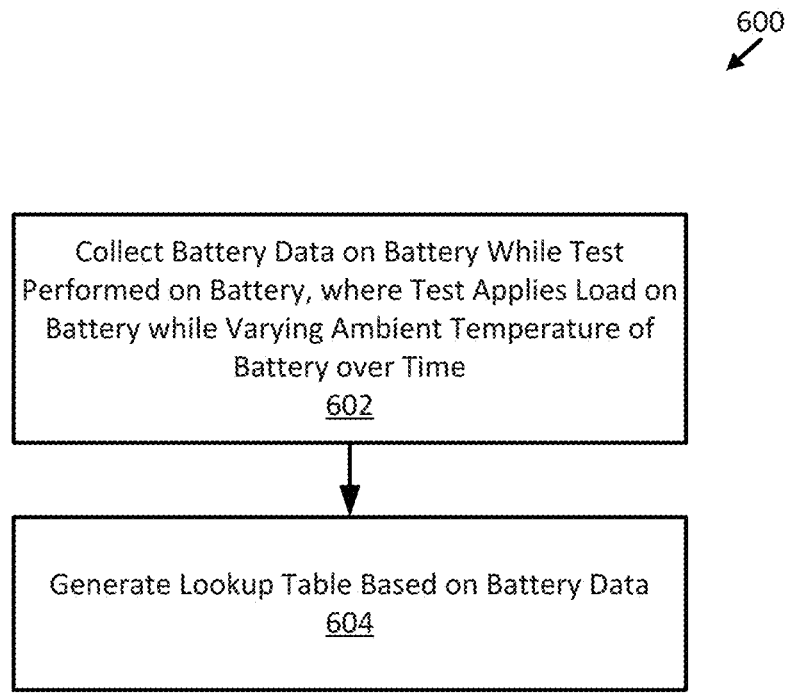
FIGS. 6 and 7 are flowcharts illustrating example methods for generating a lookup table to assist in charging a battery according to the present disclosure.

FIG. 6 is a flowchart illustrating an example method 600 for generating a lookup table to assist in charging a battery according to the present disclosure. For some examples, the method 600 may be one performed by a battery charging system. The method 600 may be implemented in the form of executable instructions stored on a machine-readable medium or in the form of electronic circuitry.

In FIG. 6, the method 600 may begin at block 602 by a battery charging system collecting battery data on a battery while a test is being performed on the battery. According to some examples, the test includes applying a load (e.g., constant load) on the battery while varying an ambient temperature of the battery over time. The battery data may describe voltage, state of charge, and ambient temperature of the battery. The battery data may further describe age of the battery. The battery data may also describe direct current (DC) resistance of the battery over time. In particular, the battery data may comprise voltage of the battery versus state of charge of the battery over ambient temperature of the battery. Depending on the example, the test may involve placing the battery in a thermal chamber, externally coupling a load to the battery, and varying the temperature in the thermal chamber over time. The test may be performed over a time period spanning weeks, months, or years.

The method 600 may continue to block 604 by the battery charging system generating, based on the battery data, a lookup table associated with the battery. According to some examples, the lookup table includes a plurality of reference charge voltage values at which to charge the battery for different ambient temperatures and different states of charge of the battery. As described herein, the lookup table generated can be used in charging batteries of the same type or of the same make and model as the battery tested under the method 600.

Figure 7:
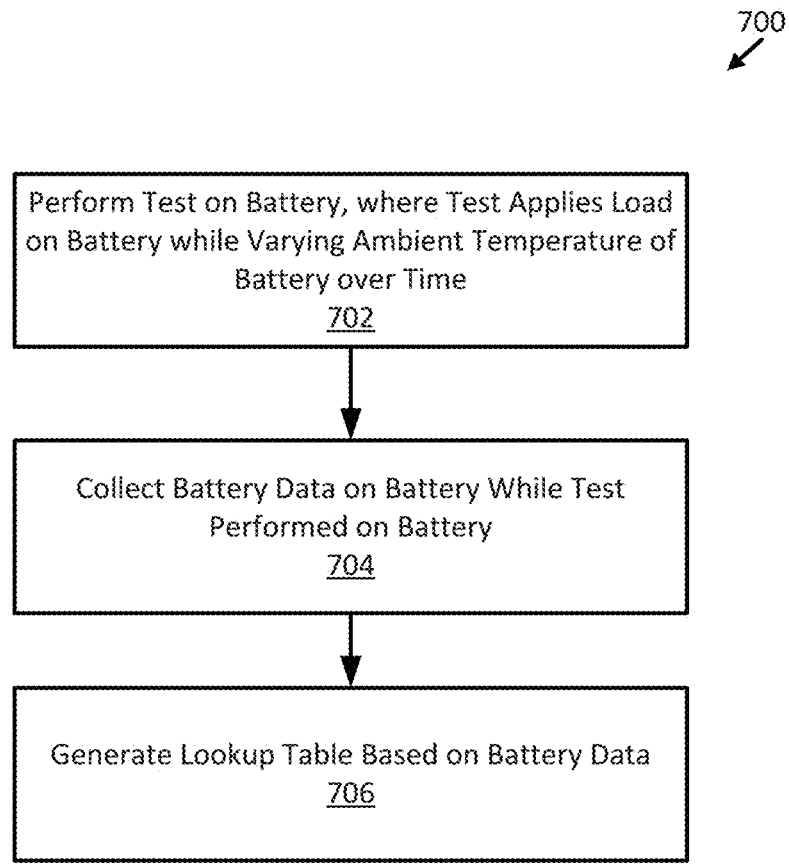

FIG. 7 is a flowchart illustrating an example method 700 for generating a lookup table to assist in charging a battery according to the present disclosure. For some examples, the method 700 may be one performed by a battery charging system. The method 700 may be implemented in the form of executable instructions stored on a machine-readable medium or in the form of electronic circuitry.

In FIG. 7, the method 700 may begin at block 702 by a battery charging system performing a test on a battery. As described herein, the test can include applying a load on the battery while varying an ambient temperature of the battery over time. The battery data may describe voltage, state of charge, and ambient temperature of the battery. The battery data may further describe age of the battery. The battery data may also describe direct current (DC) resistance of the battery over time. In particular, the battery data may comprise voltage of the battery versus state of charge of the battery over ambient temperature of the battery. Depending on the example, the test may involve placing the battery in a thermal chamber, externally coupling a load to the battery, and varying the temperature in the thermal chamber over time. The test may be performed over a time period spanning weeks, months, or years. Additionally, the battery data may further describe age of the battery.

The method 700 may continue to block 704 and 706, which may be respectively similar to blocks 602 and 604 of the method 600 as described above with respect to FIG. 6.

Figure 8:
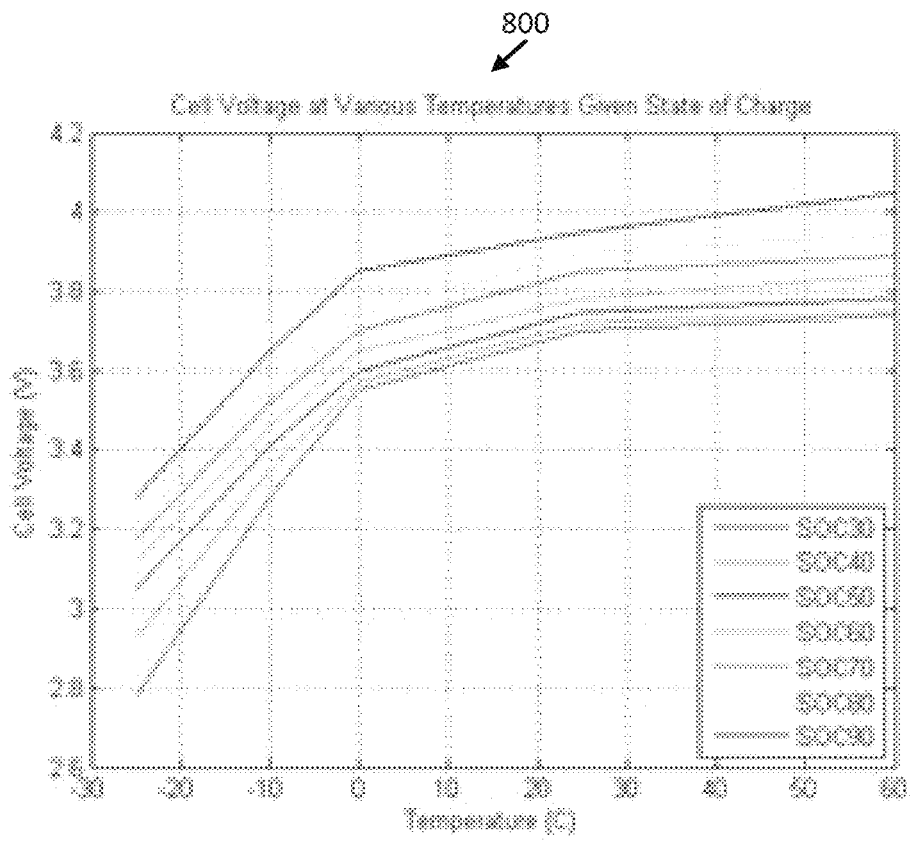
FIG. 8 provides graphs illustrating example battery data collected according to the present disclosure.
Figure 8:
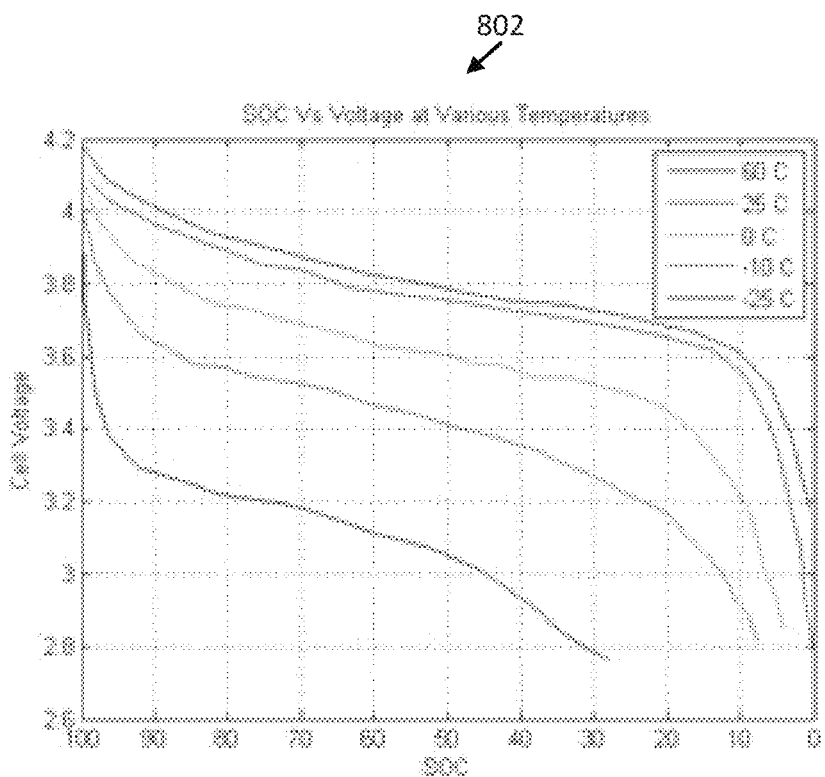

FIG. 8 provides graphs 800 and 802 illustrating example battery data collected according to the present disclosure. With respect to an example battery, the graph 800 illustrates variation in the battery's voltage over varying ambient temperatures and for different states of charge. Similarly, the graph 802 illustrates variation in the battery's voltage over varying states of charges and for different ambient temperatures. The graphs 800 and 802 represent example battery data that may be collected for a particular battery while the particular battery is under test according to some examples. As described herein, a lookup table generated based on the example battery data may be utilized in association with the particular battery, batteries of a similar type, or batteries of a similar make and model.

In the foregoing description, numerous details are set forth to provide an understanding of the subject disclosed herein. However, various examples may be practiced without some or all of these details. Some examples may include modifications and variations from the details discussed above. It is intended that the appended claims cover such modifications and variations.

The invention claimed is:
1. A battery charging system, comprising:
a battery sensor module to determine a present state of charge of a battery;
a temperature sensor module to determine a present ambient temperature of the battery;
a lookup module to retrieve, from a lookup table, a certain applied charge voltage value based on the present ambient temperature and the present state of charge of a battery; and a charging module to charge the battery by applying an applied voltage about equal to the certain applied charge voltage value to the battery.

2. The battery charging system of claim 1, wherein when the battery is at the present ambient temperature and has the present state of charge, the battery is capable of reaching full charge by charging the battery based on the certain applied charge voltage value.

3. The battery charging system of claim 1, wherein the lookup table includes a plurality of reference applied charge voltage values at which to charge the battery for different ambient temperatures and different states of charge of the battery.

4. The battery charging system of claim 1, comprising a timer module to determine a present age of the battery, the lookup module is to retrieve the certain applied charge voltage value from the lookup table based on the present ambient temperature, the present state of charge of a battery, and the present age.

5. The battery charging system of claim 4, wherein the lookup table includes a plurality of reference applied charge voltage values at which to charge the battery for different ambient temperatures, different states of charge, and different ages of the battery.

6. A non-transitory machine-readable medium having instructions stored thereon, the instructions being executable by a processor of a battery charging device, the instructions causing the processor to:
retrieve, from a lookup table, a certain applied charge voltage value based on a present ambient temperature and a present state of charge of a battery, the lookup table including a plurality of reference applied charge voltage values at which to charge the battery for different ambient temperatures and different states of charge of the battery; and
charge the battery by applying an applied voltage about equal to the certain applied charge voltage value to the battery.

7. The non-transitory machine-readable medium of claim 6, wherein the lookup table comprises a plurality of reference applied charge voltage values at which to charge the battery for different ambient temperatures and different states of charge of the battery.

8. The non-transitory machine-readable medium of claim 6, wherein the instructions cause the processor to:
determine the present ambient temperature of the battery; and
determine the present state of charge of the battery.

9. The non-transitory machine-readable medium of claim 6, wherein the instructions cause the processor to determine a present age of the battery, the retrieving the certain applied charge voltage value being based on the present ambient temperature, the present state of charge, and the present age of the battery.

10. The non-transitory machine-readable medium of claim 9, wherein the plurality of reference applied charge voltage values is for different ambient temperatures, different states of charge, and different ages of the battery.

11. The non-transitory machine-readable medium of claim 6, wherein when the battery is at the present ambient temperature and has the present state of charge, the battery is capable of reaching full charge by charging the battery based on the certain applied charge voltage value.

12. A method, comprising:
collecting battery data on a battery while a test is being performed on the battery, the test including applying a load on the battery while varying an ambient temperature of the battery over time, and the battery data describing voltage, state of charge, and ambient temperature of the battery; and
generating, based on the battery data, a lookup table associated with the battery, the lookup table including a plurality of reference applied charge voltage values at which to charge the battery for different ambient temperatures and different states of charge of the battery.

13. The method of claim 12, comprising performing the test on the battery.

14. The method of claim 12, wherein the battery data describes voltage, state of charge, ambient temperature, and age of the battery.

15. The method of claim 12, wherein the lookup table includes the plurality of reference applied charge voltage values at which to charge the battery for different ambient temperatures, different states of charge, and different ages of the battery.

16. The battery charging system of claim 1, wherein the charging module is to charge the battery based on the certain applied charge voltage value by charging the battery at an applied voltage equal to the certain applied charge voltage value.

17. The battery charging system of claim 1, wherein the applied voltage about equal to the certain applied charge voltage value comprises a dynamically determined applied charge voltage that compensates for a present ambient temperature and an age of the battery.

18. The non-transitory machine-readable medium of claim 6, wherein the instructions cause the processor to charge the battery at an applied voltage equal to the certain applied charge voltage value.

19. The non-transitory machine-readable medium of claim 6, wherein the applied voltage about equal to the certain applied charge voltage value comprises a dynamically determined applied charge voltage that compensates for a present ambient temperature and an age of the battery.

20. The non-transitory machine-readable medium of claim 6, wherein the applied voltage about equal to the certain applied charge voltage value comprises a dynamically determined applied charge voltage that compensates for a present ambient temperature of the battery.

* * * * *